No. 881,850.
PATENTED MAR. 10, 1908.
B. F. FLEGEL.
FISHING TACKLE.
APPLICATION FILED APR. 11, 1907.
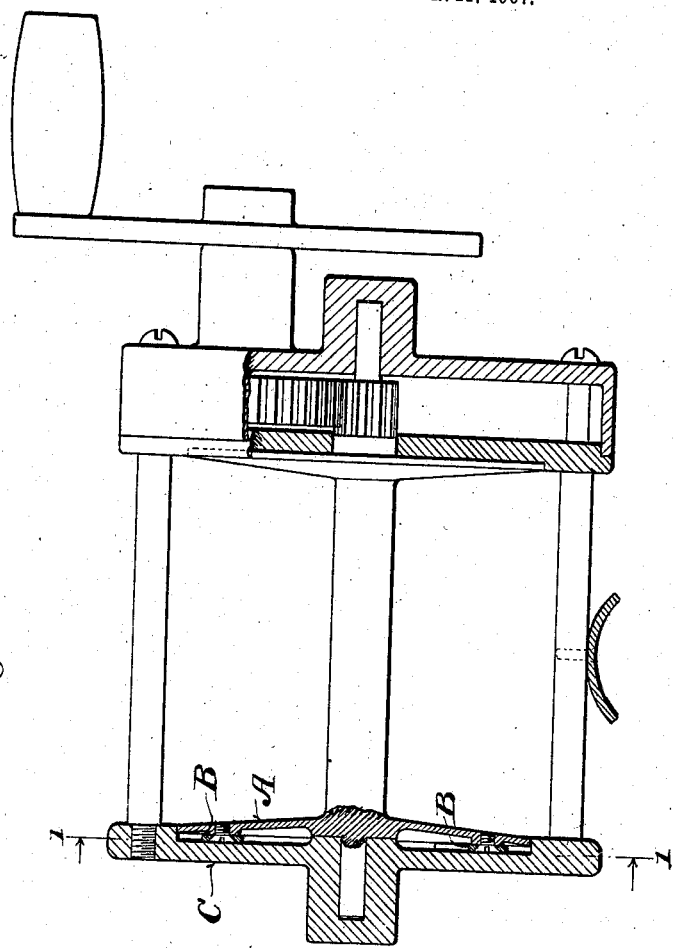
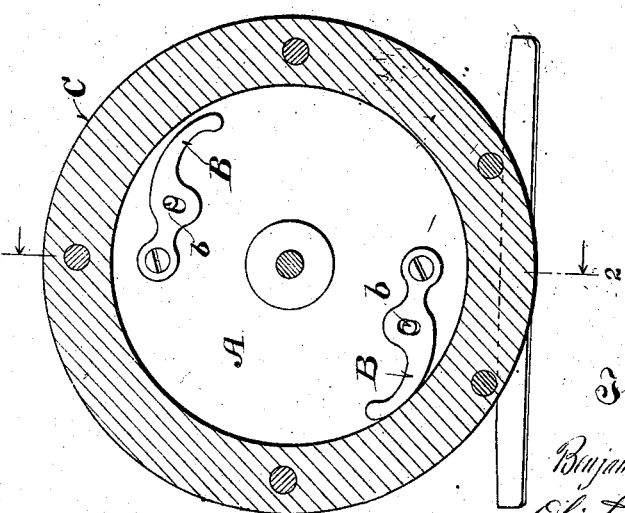
Witnesses:
Fred Palm
George Felter
Inventor:
Benjamin F. Flegel
By Oliphant & Young,
Attorneys.

UNITED STATES PATENT OFFICE.

BENJAMIN F. FLEGEL, OF RACINE, WISCONSIN.

FISHING-TACKLE.

No. 881,850.     Specification of Letters Patent.     Patented March 10, 1908.

Application filed April 11, 1907. Serial No. 367,472.

*To all whom it may concern:*

Be it known that I, BENJAMIN F. FLEGEL, a citizen of the United States, and resident of Racine, in the county of Racine and State of Wisconsin, have invented certain new and useful Improvements in Fishing-Tackle; and I do hereby declare that the following is a full, clear, and exact description thereof.

The improvements consist in what is herein shown, described and claimed; the object of the invention being to provide fishing-reels each having means for automatically governing the speed of its rotary spool when the line thereon is running out under any conditions, particularly in bait-casting operations, thus obviating the use of a thumb of an angler, in the usual manner, to control said speed as well as to prevent back-lashing of said line, and making it possible for an inexperienced person to cast as well, after little practice, as any expert caster accustomed to controlling spool-speed by thumb-pressure.

Figure 1 of the accompanying drawings represents a transverse sectional view of a fishing-reel, on the plane indicated by line 1—1 in Fig. 2, and illustrates means in connection with the spool of the reel to automatically govern the rotary speed of same. Fig. 2 of said drawings represents a front elevation of the reel aforesaid partly in section on the plane indicated by line 2—2 in Fig. 1.

Referring by letter to the drawings, A indicates one of the spool-heads of a fishing-reel provided with diametrically opposite pivotal brake-shoes B that operate, by centrifugal force, in frictional contact with the circumference of the spool-head recess in the adjacent head C of the spool-cage of the reel to govern rotary speed of the spool itself when the line wound thereon is running out under any condition, but particularly in bait-casting, the friction being at all times in proportion to said speed. Each of the brake shoes is shown provided with a slot concentric to its axis and engaged by a guide-lug *b* of the adjacent spool-head. A pair of the pivotal brake-shoes diametrically opposite one another is preferred, because of the balancing effect, but good results may be obtained by the employment of only one of said shoes.

I claim:

1. A fishing-reel spool having a head thereof provided with a pivotal brake-shoe concentrically slotted, a guide-pin on said spool-head engaging the brake-shoe slot, and a spool-cage having annularly recessed heads engaged by the spool-heads, the brake-shoe aforesaid in connection with one of said spool-heads being operated by centrifugal force in the recess of the adjacent cage-head to automatically govern speed of the spool as a whole when a line wound thereon is running out.

2. A fishing-reel spool having a head thereof provided with diametrically opposite pivotal brake-shoes each concentrically slotted, guide-pins on said spool-head each engaging a brake-shoe slot, and a spool-cage having annularly recessed heads engaging by the spool-heads, the brake-shoes aforesaid in connection with one of said spool-heads being operated by centrifugal force in the recess of the adjacent cage-head to automatically govern speed of the spool as a whole when a line wound thereon is running out.

3. A fishing-reel comprising a spool, a cage therefor having one of its heads formed with a recess to accommodate a head of said spool, a brake-shoe consisting of a single independent element pivotally mounted at one end on the spool-head and designed to freely swing outwardly to engage the wall of said recess, and means for limiting the inward movement of the brake-shoe element.

In testimony that I claim the foregoing I have hereunto set my hand at Racine in the county of Racine and State of Wisconsin in the presence of two witnesses.

BENJAMIN F. FLEGEL.

Witnesses:
   L. D. MILLER,
   G. R. SHEPARD.